US011658742B2

(12) United States Patent
Brown et al.

(10) Patent No.: US 11,658,742 B2
(45) Date of Patent: May 23, 2023

(54) SYSTEM FOR MULTI-CHANNEL, DIVERGED-BEAM OPTICAL WIRELESS COMMUNICATION

(71) Applicant: 8 Rivers Capital, LLC, Durham, NC (US)

(72) Inventors: William J. Brown, Durham, NC (US); Hannah Clark, Durham, NC (US); David Freed, Durham, NC (US); Miles R. Palmer, Chapel Hill, NC (US)

(73) Assignee: 8 Rivers Capital, LLC, Durham, NC (US)

( * ) Notice: Subject to any disclaimer, the term of this patent is extended or adjusted under 35 U.S.C. 154(b) by 419 days.

(21) Appl. No.: 16/281,867

(22) Filed: Feb. 21, 2019

(65) Prior Publication Data

US 2019/0260471 A1    Aug. 22, 2019

Related U.S. Application Data

(60) Provisional application No. 62/633,940, filed on Feb. 22, 2018.

(51) Int. Cl.
*H04B 10/11* (2013.01)
*H04B 10/112* (2013.01)

(52) U.S. Cl.
CPC ......... *H04B 10/11* (2013.01); *H04B 10/1121* (2013.01)

(58) Field of Classification Search
USPC .......................................................... 398/118
See application file for complete search history.

(56) References Cited

U.S. PATENT DOCUMENTS 5,214,527 A * 5/1993 Chang ................. H03K 17/693
250/214 A
6,016,212 A * 1/2000 Durant .................. H04B 10/11
385/43

(Continued)

FOREIGN PATENT DOCUMENTS

WO   2016/047100 A1   3/2016
WO   2017/025876 A1   2/2017

OTHER PUBLICATIONS

Barden et al., Volume-phase holographic gratings and their potential for astronomical applications, Jun. 1999. (Year: 1999).*

(Continued)

*Primary Examiner* — Jai M Lee
(74) *Attorney, Agent, or Firm* — Womble Bond Dickinson (US) LLP

(57) ABSTRACT

An optical receiver is provided for a diverged-beam, free space optical communications system. The optical receiver includes a demultiplexer and a detector array. The demultiplexer includes a diffractive optic configured to receive an optical beam propagating in free space. The optical beam includes a plurality of optical carrier signals of respective wavelengths for a plurality of communication channels, and the diffractive optic is configured to spatially separate the optical beam by wavelength into the plurality of optical carrier signals. The detector array includes a plurality of optical detectors configured to convert the plurality of optical carrier signals into a respective plurality of electrical signals for the plurality of communication channels. The plurality of optical detectors includes at least twice as many optical detectors as optical carrier signals in the plurality of optical carrier signals.

22 Claims, 8 Drawing Sheets

(56) References Cited

U.S. PATENT DOCUMENTS

| | | | |
|---|---|---|---|
| 6,263,127 B1* | 7/2001 | Dragone | G02B 6/12019 385/24 |
| 6,367,989 B1* | 4/2002 | Hartman | G02B 6/06 385/115 |
| 6,373,606 B1* | 4/2002 | Nakama | G01J 3/02 257/E27.129 |
| 6,563,977 B1* | 5/2003 | Chen | G02B 6/29307 385/24 |
| 6,983,110 B2* | 1/2006 | Buckman | H04B 10/69 398/153 |
| 7,372,124 B2* | 5/2008 | Tagami | G01J 1/42 257/458 |
| 7,986,595 B2* | 7/2011 | Kaneda | G11B 7/1374 369/112.03 |
| 8,064,772 B2* | 11/2011 | Ieda | H04B 10/506 398/118 |
| 8,301,032 B2* | 10/2012 | Majumdar | H04B 10/1123 398/131 |
| 10,110,322 B2* | 10/2018 | Britz | H04K 1/003 |
| 10,333,618 B2* | 6/2019 | Djordjevic | H04B 10/07955 |
| 10,547,382 B2* | 1/2020 | Feng | H04B 10/564 |
| 2002/0196506 A1* | 12/2002 | Graves | H04B 10/1125 398/126 |
| 2003/0035178 A1* | 2/2003 | Seaver | H04B 10/1121 398/129 |
| 2003/0063385 A1* | 4/2003 | Takushima | G02B 6/272 359/566 |
| 2003/0147652 A1* | 8/2003 | Green | H04Q 11/0005 398/118 |
| 2003/0215176 A1* | 11/2003 | Britz | H04B 10/1125 385/24 |
| 2004/0136071 A1* | 7/2004 | Morey | G02B 6/29311 359/566 |
| 2004/0202474 A1* | 10/2004 | Britz | H04B 10/1125 398/118 |
| 2006/0209766 A1* | 9/2006 | Britz | H04K 1/003 370/335 |
| 2007/0172240 A1* | 7/2007 | Terai | H04J 14/02 398/83 |
| 2008/0056723 A1* | 3/2008 | Giles | H04B 10/118 398/118 |
| 2011/0085222 A1* | 4/2011 | Komiya | G02B 6/272 359/223.1 |
| 2015/0037042 A1* | 2/2015 | Gurovich | H04B 10/116 398/118 |
| 2016/0041523 A1* | 2/2016 | Ashrafi | G03H 1/2645 359/9 |
| 2016/0294472 A1* | 10/2016 | Palmer | H04B 7/0617 |
| 2017/0070289 A1* | 3/2017 | Takahashi | H04B 10/60 |
| 2017/0353241 A1* | 12/2017 | Fazal | H04B 10/2581 |
| 2018/0041275 A1* | 2/2018 | Gallagher | H04B 10/118 |
| 2018/0212681 A1* | 7/2018 | Tanaka | H04B 10/118 |
| 2018/0270010 A1* | 9/2018 | Troeltzsch | H04B 10/118 |

OTHER PUBLICATIONS

Kitzmiller, Aubrey A., Non-Amplified Photodetector User's Guide, 2014 (Year: 2014).*
OPTEK Technology, Inc., PIN Silicon Photodiode: OP913 Series, 2016 (Year: 2016).*
International Search Report from International Appl. No. PCT/IB2019/051439, dated Jun. 3, 2019.
Pavelchek et al., "Control Method for Free-Space Optical Communication System," U.S. Appl. No. 60/241,419, filed Oct. 17, 2000.
Pavelcheck et al., "Establishment and Maintenance of Optical Links Between Optical Links Between Optical Transceiverr Nodes in Free-Space Optical Communication Networks," U.S. Appl. No. 60/241,315, filed Oct. 16, 2000.
Paudel et al., "Modelling of Free Space Optical Link for Ground-to-Train Communications Using a Gaussian Source," IET Optoelectronics, Feb. 2013, 18 pages.

* cited by examiner

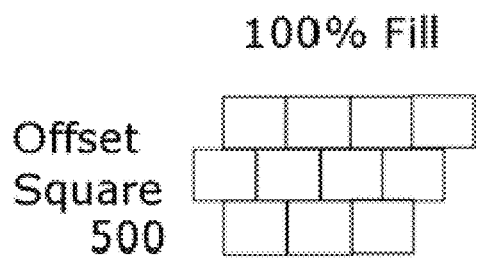
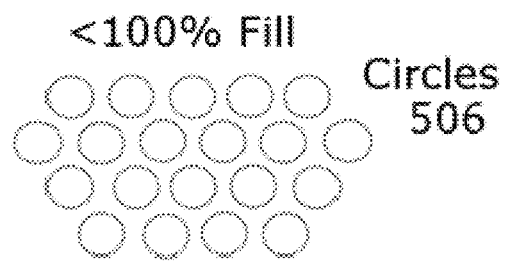
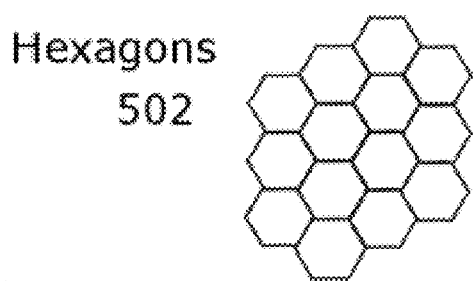
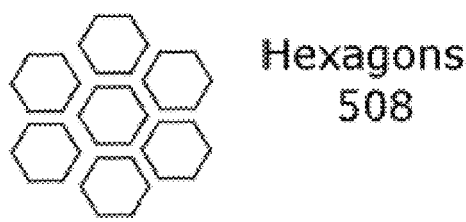
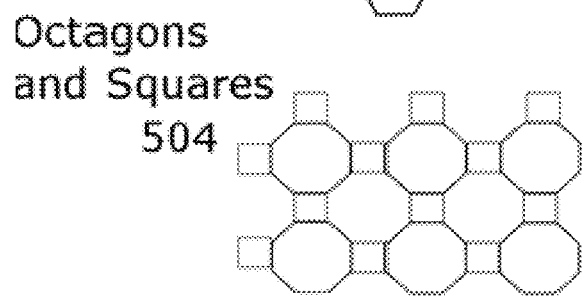
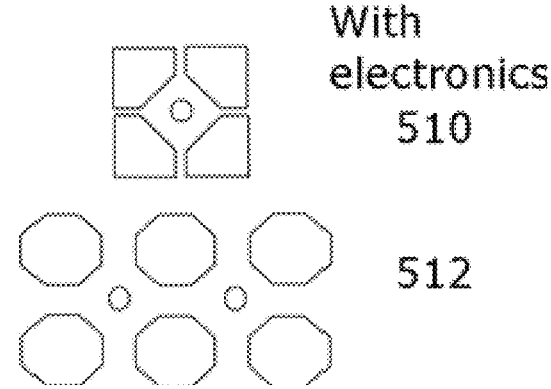
FIG. 5(A)  FIG. 5(B)

SYSTEM FOR MULTI-CHANNEL, DIVERGED-BEAM OPTICAL WIRELESS COMMUNICATION

CROSS-REFERENCE TO RELATED APPLICATIONS

The present application claims priority to U.S. Provisional Patent Application No. 62/633,940, entitled: System for Multi-Channel, Diverged-Beam Optical Wireless Communication, filed Feb. 22, 2018, the content of which is incorporated herein by reference in its entirety.

TECHNOLOGICAL FIELD

The present disclosure relates generally to high-speed free-space optical communication links and, in particular, to using multiple channels to increase the bandwidth over a single physical path or link.

BACKGROUND

The concept of free space optical (FSO) communications using lasers dates back to the invention of the laser. However, difficulties with generating and modulating high-power lasers have restricted the use of FSO to line-of-sight systems using tightly-collimated beams. Very low-power and low-modulation-rate with diverged pulses of light has been used in a few niche applications such as remote controls for televisions and other appliances. Even during the telecom boom of the late 1990's and early 2000's when billions of dollars of investment was made in components and systems, FSO systems did not reach beyond collimated beams in line-of-sight configurations. There are several existing companies selling FSO line-of-sight systems, but these systems require precise alignment and skilled installation. These systems costs start around US $10,000 per link, and only a few thousand systems are shipped per year.

A recently-developed FSO communication system that that takes into account and resolves at least some of the issues discussed above, as well as possibly other issues, is described in U.S. Pat. No. 9,847,834, which is incorporated by reference. It is nonetheless often desirable to further improve on and extend existing systems and methods.

BRIEF SUMMARY

Example implementations of the present disclosure relate to using multiple channels to increase the bandwidth over a single physical path or link in a free space optical (FSO) communication system. One example of a suitable FSO communication system is a diverged-beam FSO (DBFSO) system such as that disclosed by the '834 patent. Example implementations expand on FSO communication systems such as the DBFSO system disclosed by the '834 patent to multiple wavelengths and higher data rates and provide hardware and software innovations to reach up to and beyond 1 Tbps (terabits per second) in a single optical link.

These links may be unidirectional, bidirectional, one to many, many to one, or some combination.

In accordance with example implementations, channels may operate at different wavelengths or different polarizations or different angular momentum states. The wavelengths may be multiplexed together either spectrally, using a diffraction grating, or spatially, using multiple apertures at the transmit side of a link. This choice may be based on eye safe power levels.

On the receive side, the wavelengths may be demultiplexed using a diffractive optical element. Individual channels may undergo optoelectronic conversion at one or more photodiodes operating at the channel bandwidth.

Channels may also be multiplexed using polarization including orthogonal polarizations such as vertical and horizontal. Multiplexing and demultiplexing may then be achieved with a polarizing beam splitter. Differential detection may be used to increase the SNR in a given polarization.

The present disclosure thus includes, without limitation, the following example implementations.

Some example implementations provide a diverged-beam, free space optical (DBFSO) communications system comprising: an optical transmitter configured to produce a plurality of optical carrier signals of respective wavelengths for a plurality of communication channels, combine the plurality of optical carrier signals into an optical beam, and transmit the optical beam for propagation in free space; and an optical receiver configured to receive the optical beam propagating in free space, spatially separate the optical beam by wavelength into the plurality of optical carrier signals, and convert the plurality of optical carrier signals into a respective plurality of electrical signals for the plurality of communication channels, the optical receiver including a plurality of optical detectors configured to convert the plurality of optical carrier signals into the respective plurality of electrical signals, the plurality of optical detectors including at least twice as many optical detectors as optical carrier signals in the plurality of optical carrier signals.

In some example implementations of the DBFSO system of any preceding example implementation, or any combination of any preceding example implementations, the optical receiver includes a demultiplexer with a diffraction grating configured to spatially separate the optical beam by wavelength into the plurality of optical carrier signals.

In some example implementations of the DBFSO system of any preceding example implementation, or any combination of any preceding example implementations, the optical receiver includes a demultiplexer with a holographic volume phase grating configured to spatially separate the optical beam by wavelength into the plurality of optical carrier signals.

In some example implementations of the DBFSO system of any preceding example implementation, or any combination of any preceding example implementations, the optical receiver includes a demultiplexer with first and second diffractive optics configured to spatially separate the optical beam along two axes.

In some example implementations of the DBFSO system of any preceding example implementation, or any combination of any preceding example implementations, each of the optical detectors of the plurality of optical detectors is at most 9 microns in size.

In some example implementations of the DBFSO system of any preceding example implementation, or any combination of any preceding example implementations, the optical receiver includes a demultiplexer including a diffractive optic configured to spatially separate the optical beam by wavelength into the plurality of optical carrier signals, and an additional optic configured to split the optical carrier signals by polarization.

In some example implementations of the DBFSO system of any preceding example implementation, or any combination of any preceding example implementations, the optical receiver includes a demultiplexer including a diffractive optic configured to spatially separate the optical beam by wavelength into the plurality of optical carrier signals, and an additional optic configured to split the optical carrier signals by configured to split the optical carrier signals by angular orbital momentum.

In some example implementations of the DBFSO system of any preceding example implementation, or any combination of any preceding example implementations, the optical receiver includes a demultiplexer including a diffractive optic configured to spatially separate the optical beam by wavelength into the plurality of optical carrier signals, and further includes an array of optics between the diffractive optic and detector array, the array of optics configured to spatially spread the plurality of optical carrier signals.

In some example implementations of the DBFSO system of any preceding example implementation, or any combination of any preceding example implementations, the array of optics is an array of mirrors.

In some example implementations of the DBFSO system of any preceding example implementation, or any combination of any preceding example implementations, the plurality of optical detectors includes multiple detectors for each communication channel of the plurality of communication channels, wherein the optical receiver further includes solid-state switching devices coupled to respective ones of the plurality of optical detectors, and by which the respective ones of the plurality of optical detectors are individually and separately selectable for connection to processing circuitry, and wherein the multiple detectors for each communication channel are individually and separately selectable so that in some instances at least some but not all of the multiple detectors are selected, and others of the multiple detectors are not utilized.

In some example implementations of the DBFSO system of any preceding example implementation, or any combination of any preceding example implementations, the others of the multiple detectors that are not utilized are connected to a low voltage or ground, or to a high voltage, by respective ones of the solid-state switching devices coupled to the others of the multiple detectors.

Some example implementations provide an optical receiver for a DBFSO communications system, the optical receiver comprising: a demultiplexer including a diffractive optic configured to receive an optical beam propagating in free space, the optical beam including a plurality of optical carrier signals of respective wavelengths for a plurality of communication channels, the diffractive optic configured to spatially separate the optical beam by wavelength into the plurality of optical carrier signals; and a detector array including a plurality of optical detectors configured to convert the plurality of optical carrier signals into a respective plurality of electrical signals for the plurality of communication channels, the plurality of optical detectors including at least twice as many optical detectors as optical carrier signals in the plurality of optical carrier signals.

In some example implementations of the optical receiver of any preceding example implementation, or any combination of any preceding example implementations, the diffractive optic is a diffraction grating.

In some example implementations of the optical receiver of any preceding example implementation, or any combination of any preceding example implementations, the diffraction grating is a holographic volume phase grating.

In some example implementations of the optical receiver of any preceding example implementation, or any combination of any preceding example implementations, the demultiplexer includes first and second diffractive optics configured to spatially separate the optical beam along two axes.

In some example implementations of the optical receiver of any preceding example implementation, or any combination of any preceding example implementations, each of the optical detectors of the plurality of optical detectors is at most 9 microns in size.

In some example implementations of the optical receiver of any preceding example implementation, or any combination of any preceding example implementations, the optical receiver further comprises an additional optic configured to split the optical carrier signals by polarization.

In some example implementations of the optical receiver of any preceding example implementation, or any combination of any preceding example implementations, the optical receiver further comprises an additional optic configured to split the optical carrier signals by configured to split the optical carrier signals by angular orbital momentum.

In some example implementations of the optical receiver of any preceding example implementation, or any combination of any preceding example implementations, the optical receiver further comprises an array of optics between the diffractive optic and detector array, and configured to spatially spread the plurality of optical carrier signals.

In some example implementations of the optical receiver of any preceding example implementation, or any combination of any preceding example implementations, the array of optics is an array of mirrors.

Some example implementations provide a DBFSO communications system comprising: an optical transmitter configured to produce a plurality of optical carrier signals of respective wavelengths for a plurality of communication channels, combine the plurality of optical carrier signals into an optical beam, and transmit the optical beam for propagation in free space; and an optical receiver configured to receive the optical beam propagating in free space, spatially separate the optical beam by wavelength into the plurality of optical carrier signals, and convert the plurality of optical carrier signals into a respective plurality of electrical signals for the plurality of communication channels, the optical receiver including a plurality of optical detectors configured to convert the plurality of optical carrier signals into the respective plurality of electrical signals, the plurality of optical detectors having an acceptance angle greater than 0.1 degree for at least some of the communication channels.

In some example implementations of the DBFSO system of any preceding example implementation, or any combination of any preceding example implementations, the optical receiver includes a demultiplexer with a diffraction grating or a holographic volume phase grating configured to spatially separate the optical beam by wavelength into the plurality of optical carrier signals.

These and other features, aspects and advantages of the present disclosure will be apparent from a reading of the following detailed description together with the accompanying figures, which are briefly described below. The present disclosure includes any combination of two, three, four, or more features or elements set forth in this disclosure, regardless of whether such features or elements are expressly combined or otherwise recited in a specific implementation description herein. This disclosure is intended to be read holistically such that any separable features or elements of the disclosure, in any of its aspects and implementations, should be viewed as combinable, unless the context of the disclosure clearly dictates otherwise.

It will therefore be appreciated that the above Summary is provided merely for purposes of summarizing some example implementations so as to provide a basic understanding of some aspects of the disclosure. As such, it will be appreciated that the above described example implementations are merely examples of some implementations and should not be construed to narrow the scope or spirit of the disclosure in any way. It will be appreciated that the scope of the disclosure encompasses many potential implementations, some of which will be further described below, in addition to those here summarized. Further, other aspects and advantages of implementations disclosed herein will become apparent from the following detailed description taken in conjunction with the accompanying figures which illustrate, by way of example, the principles of the described implementations.

BRIEF DESCRIPTION OF THE FIGURE(S)

Having thus described the disclosure in the foregoing general terms, reference will now be made to the accompanying figures, which are not necessarily drawn to scale, and wherein:

FIGS. 1(A) and 1(B) illustrate respectively an example grating that separates beams of different wavelengths spatially on a detector plane, and resulting modeled spots on the detector plane, according to various example implementations of the present disclosure;

FIGS. 2(A) and 2(B) illustrate respectively a dual grating with axes rotated with respect to each other followed by a pair of achromatic doublets, and a detector surface in which light is focused to points that lay along a diagonal line on the detector surface, according to various example implementations;

Figure 6:
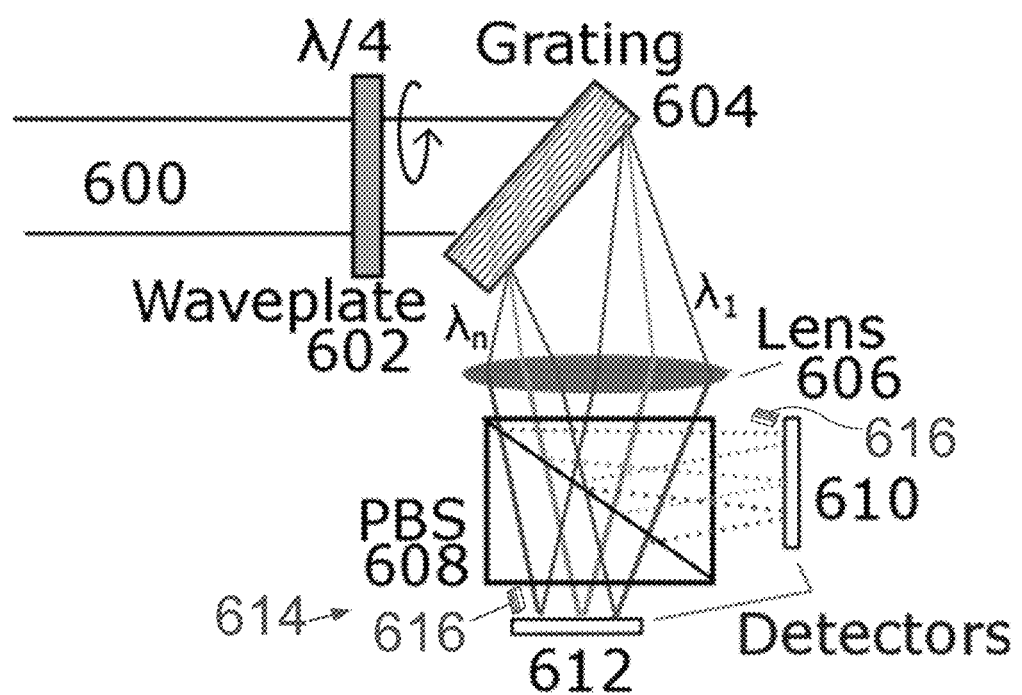
Figure 7A:
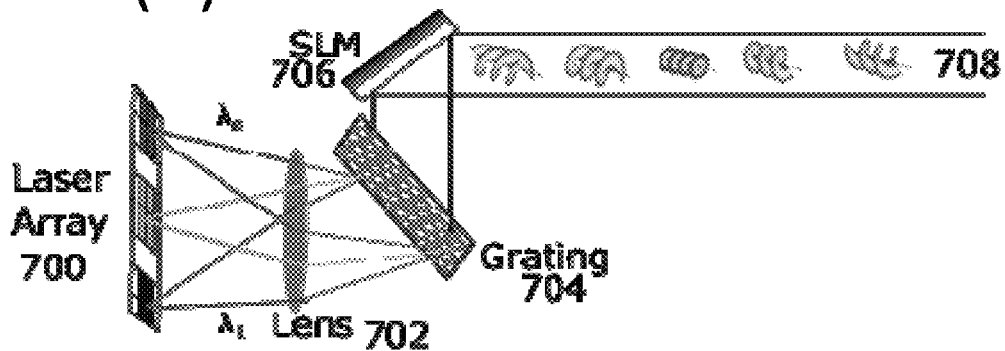
Figure 7B:
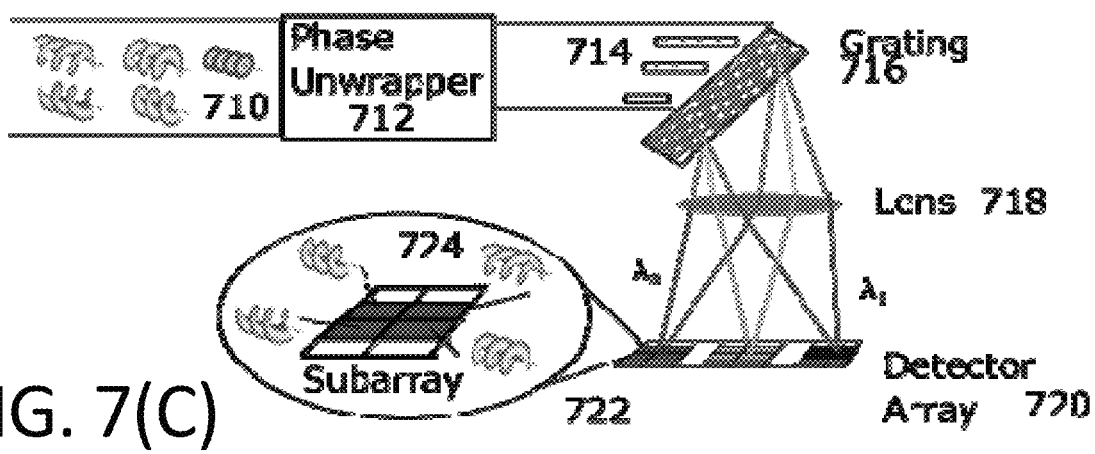
Figure 7C:
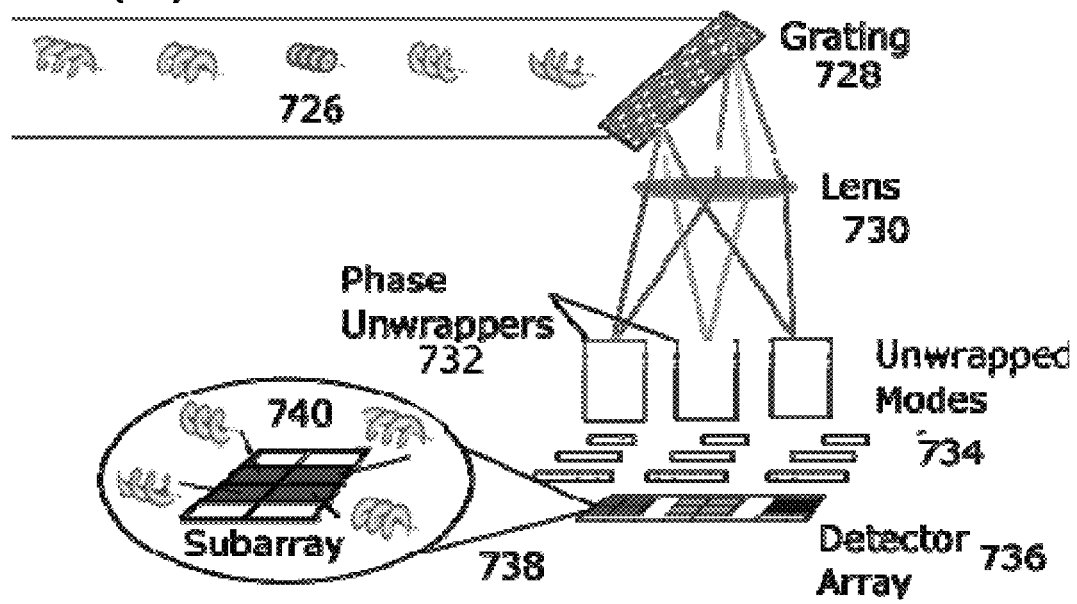
Figure 8:
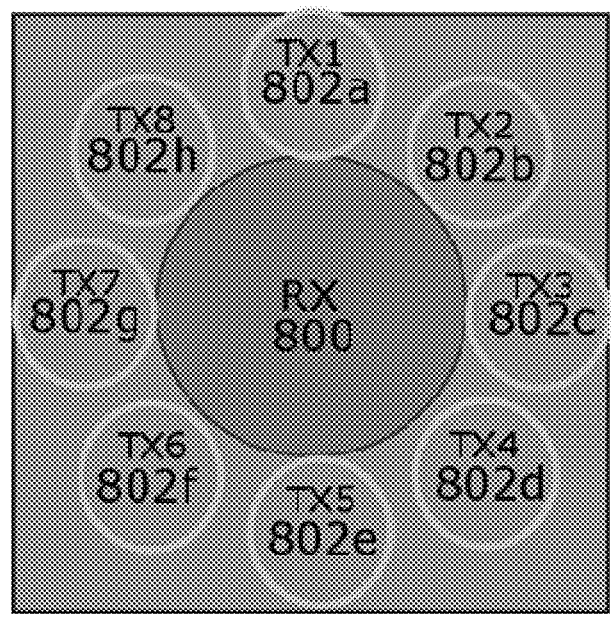
Figure 9A:
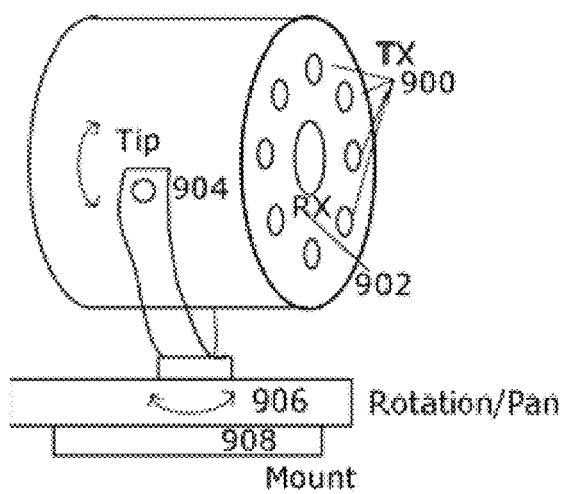
Figure 9B:
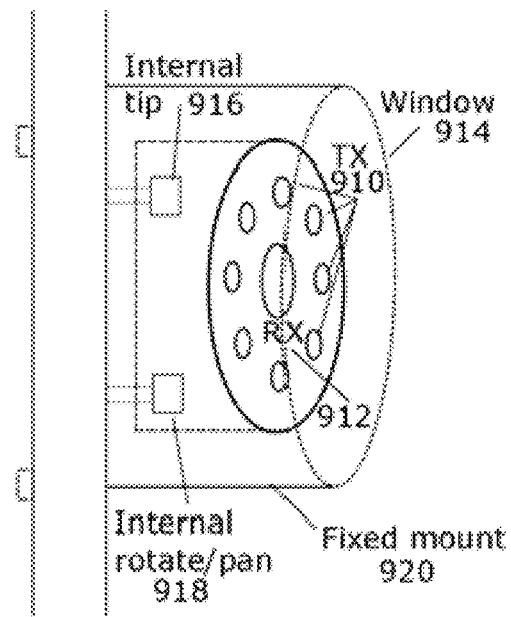
Figure 10:
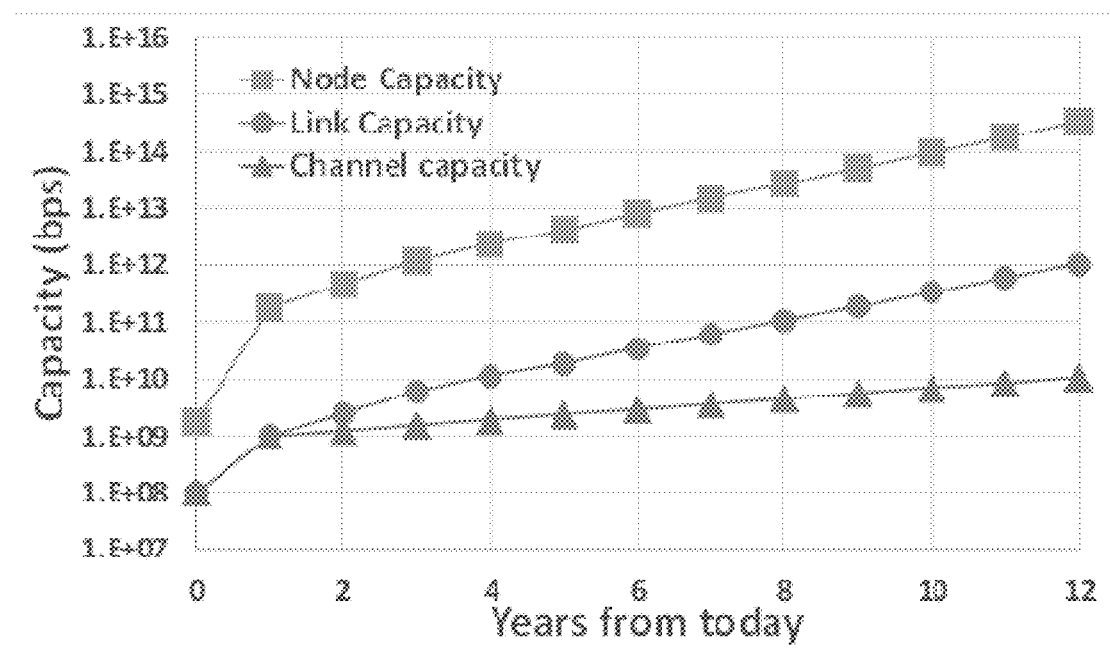

FIGS. 5(A) and 5(B) illustrate examples of various detector shapes for respectively a 100% fill factor on an array, and less than 100% fill, according to example implementations;

FIG. 6 illustrates circularly polarized light that passes through a quarter wave-plate to adjust polarization, then diffracts off of the grating and gets focused by the lens onto a polarizing beam splitter that directs left hand (LH) polarization into one detector and right hand (RH) polarization to the other, according to example implementations;

FIGS. 7(A), 7(B) and 7(C) illustrates orbital angular momentum (OAM) and multi-wavelength multiplexing, according to example implementations;

FIG. 8 illustrates an example of multiple apertures used to reduce the power density for eye safety, according to example implementations;

FIGS. 9(A) and 9(B) illustrate setups for pointing the transmit and receive beams can involve either moving the whole setup, or moving just the transmit and receive subsystem within a fixed mount, according to example implementations; and FIG. 10 illustrates potential increase in channel, link and node capacity over time, according to example implementations.

DETAILED DESCRIPTION

The present disclosure will now be described more fully hereinafter with reference to example implementations thereof. These example implementations are described so that this disclosure will be thorough and complete, and will fully convey the scope of the disclosure to those skilled in the art. Indeed, the disclosure may be embodied in many different forms and should not be construed as limited to the implementations set forth herein; rather, these implementations are provided so that this disclosure will satisfy applicable legal requirements. As used in the specification and the appended claims, for example, the singular forms "a," "an," "the" and the like include plural referents unless the context clearly dictates otherwise. Also, for example, reference may be made herein to quantitative measures, values, relationships or the like. Unless otherwise stated, any one or more if not all of these may be absolute or approximate to account for acceptable variations that may occur, such as those due to engineering tolerances or the like.

To insure consistent nomenclature, the following terms are used: node, link, and channel. A node is a physical location within the network and may be stationary or mobile. A link is a DBFSO connection between two or more nodes that transmits and receives data and network control information between the nodes. A channel is a single path within a link and is differentiated from other channels by some physical characteristic such as wavelength or polarization and undergoes an electrical to optical (E-O) and optical to electrical (O-E) conversion. A DBFSO system such as that disclosed by the '834 patent is made up of many nodes, with each node having one or more links to other nodes. Each link is then made up of one or more channels.

Channels may have different uses and may operate at different data rates. For example, one channel could be used as a clock and other channels used as data. An example of where this could be needed is in pulse position modulation (PPM), where the duty cycle on the data channel is relatively low and the receive clock generated from the data is prone to larger timing jitter. A clock channel with a higher duty cycle can then keep the receive clock synchronized. This clock may operate at the data rate of the data channels or at a higher or lower rate. PPM can be used with bin sizes that are less than the bit size resulting in data rates that are higher than the intrinsic bit period. PPM can also be used across multiple channels. Other possible channels may carry control layer information, or a mixture of data and control layer information.

The optical to electrical conversion (O-E) may be done by a detector, an element, a pixel, or multiples of such devices.

Another consideration for data transmission is relative signaling, where the relative intensity difference between two or more channels may also carry information. That is, differential or phase encoding may be used by varying one channel relative to another channel. Phase can be varied between two polarizations at a given wavelength or at different wavelengths.

Multi-Channel FSO Using Diffractive Element(s).

In keeping with the previous patent, this application describes diverged beam free space optical communications systems. Here the links have more than one channel per link. For a given link, they meet the divergence and photonic efficiency set by U.S. Pat. No. 9,847,834. That is the transmitter has a beam divergence of greater than 0.1 degree, the receiver has an acceptance angle of greater than 0.1 degree, and the photonic efficiency of a particular channel is less than 0.05%. Here, the photonic efficiency may relate a number of photons of the optical beam detectable by the optical receiver, to a number of photons of the optical beam emitted by the optical transmitter.

On the receiver side of the link, the multiple channels may be spectrally separated by a diffractive element combined with one or more focusing elements. The diffractive element typically maps wavelength to angle. A focusing element can then map angle to physical location. This is similar to what happens in a spectrometer. One difference is that here the input light is already collimated or nearly so, whereas a spectrometer has an input slit or aperture and must then internally collimate the light prior to the diffractive element.

One example implementation may use diffraction gratings. They spatially separate multiple wavelengths by angle, a process called angular dispersion. One or more lenses can then be used to map the angles to separate spatial locations. Using a higher line density grating and longer focal length lens provides more angular dispersion, i.e., larger physical separation between two given wavelengths. However, it is difficult to build diffraction gratings with line densities higher than 1900 l/mm (lines per millimeter), and the use of longer focal length lenses causes a decrease in acceptance angle for a single wavelength at the collection aperture, making collection more challenging.

The general equation for a diffraction grating is:

$$d(\sin \theta_i + \sin \theta_o) = m\lambda$$

where d is the line spacing of the grating, $\theta_i$ is the input angle, $\theta_o$ is the output angle, m is the diffraction order and $\lambda$ is the wavelength of light in vacuum. Using a convex lens (or lenses or concave mirror) the output angle(s) can be mapped to spatial locations. To first order, the spatial separation between two different wavelengths is given by the angular separation times the focal length of the lens. The output angular separation between two different wavelengths (assuming that the two wavelengths come in at the same incident angle) is given by:

$$\Delta\theta = \sin^{-1}\left(\frac{2\lambda_n - \lambda_1}{2d}\right) - \sin^{-1}\left(\frac{\lambda_1}{2d}\right)$$

Figures 1A, 1B:
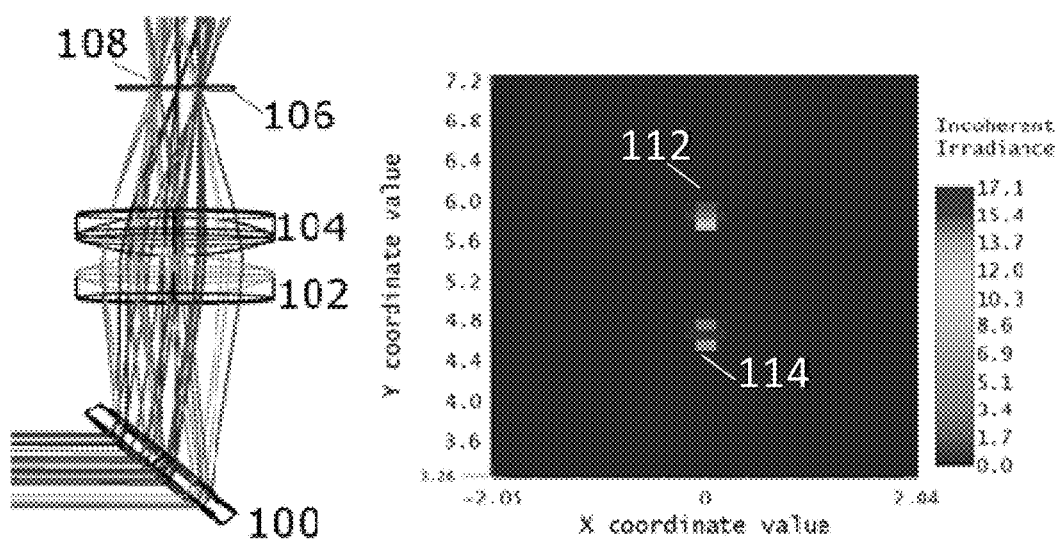

As an example, a 1666 l/mm grating, has a line spacing of d=0.6 microns. If $\lambda_n$=0.9 microns, $\lambda_1$=0.8 microns, then, $\Delta\theta$=0.25 radians. Combined with a 50 millimeter focal length lens, the physical spacing between the two wavelengths is 12.7 millimeters. This system is shown in FIG. 1(A), where the grating 100 is 1666 l/mm, there are two 100 mm focal length achromatic doublets 102, 104 which simulate a 50 mm focal length lens and reduce chromatic aberration, and a detector plane 106. Each distinct wavelength is focused to a different spatial spot on the detector plane 106. An example of one such focused spot is 108. FIG. 1(B) shows the resulting modeled spots 112, 114 on the detector plane 106 for two wavelengths separated by 10 nm. A 10 nm spectral separation for wavelengths in the 800-900 nm range result in a spatial separation on the detector plane 106 of ~1.2 mm apart. This agrees with the theoretical calculation that 100 nm bandwidth is 12.7 mm apart.

The trade-off to using longer focal length lenses to increase spatial separation of wavelengths is that the angular acceptance of a given detector is, to first order, given by the detector diameter divided by the focal length of the lens. A 1 millimeter diameter detector and a 50 millimeter focal length lens have an approximate acceptance angle of $\frac{1}{50}$=0.02=1.2 degree total=+/−0.6 degrees. If the 1 mm detectors have no dead space between them, a 27 millimeter lens is sufficient to spread 100 nm across 10 detectors and the angular acceptance of a single detector is approximately $\frac{1}{27}$=0.037=2.2 degrees. There is no scaling with detector size, 100 micron detectors may require a 2.7 millimeter focal length lens and still have a 2.2 degree acceptance angle (assuming no dead space), however the optical gain for each detector is now smaller. There is a system advantage with small detectors since they enable higher data rates and reduce the overall system size for a given number of channels. In some examples, the acceptance angle is at least 0.1 degrees, and may be up to 10 degrees. And in some examples, the acceptance angle of a detector with an array of elements may be up to $4\pi$ steradians to provide spherical coverage.

Figures 2A, 2B:
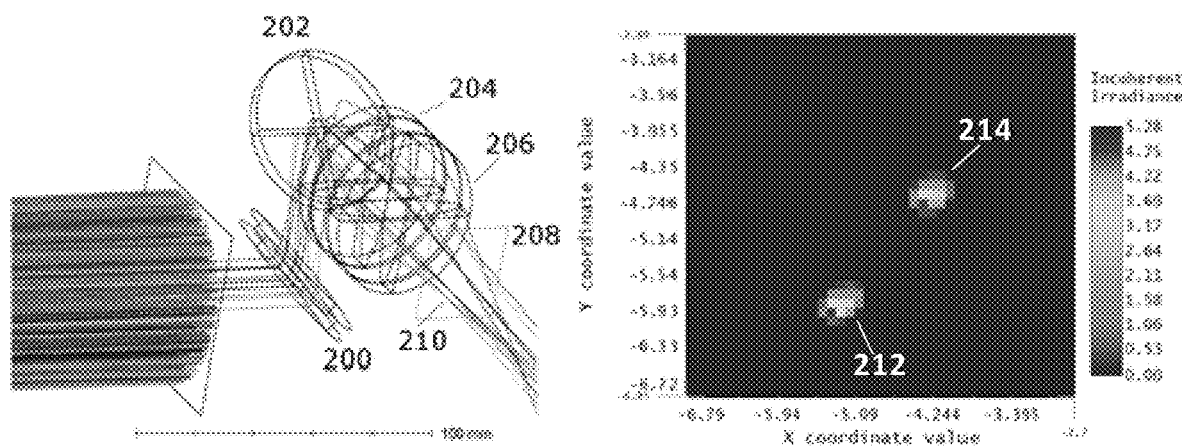

A single grating only generates diffraction along the axis perpendicular to its grating lines. Another example may include two gratings with the second grating rotated approximately 90 degrees relative to the first so that the grating lines are at nearly right angles to each other and thus generates dispersion in two axes. This is shown in FIG. 2(A). Here, light is first diffracted by the first grating 200, then diffracted in the orthogonal direction by an orthogonally oriented second grating 202. It is focused through two achromatic doublets 204, 206 onto a detector plane 208. One such spot 210 is shown in green, while other wavelengths are focused to different spatial locations across the detector plane 208. This approach may increase the physical distance between two given wavelengths, and may reduce the amount of ambient light that reaches a detector located at the focal plane. In FIG. 2(B), the spots 212, 214 that are focused on the detector are 10 nm apart spectrally and compared to the single axis case, their spatial separation is increased by $\sqrt{2}$ relative to the single grating. In some examples, the two gratings may be physically built into one optic. For example, a volume phase holographic grating can have multiple gratings written into it.

In some examples, the diffraction gratings may be surface transmission gratings or reflection gratings or volume phase holographic gratings. Also available are holographic optical elements (HOE) which may include gratings and lenses. The grating period may be any value from 100 lines/mm up the physical limit of $1000/(\lambda/2)$ lines/mm. For 840 nm light this is 2,380 lines/mm.

Another method to create angular dispersion is by using prisms or other diffractive optics (DOEs).

Another example may generate dispersion using a traveling RF or sound wave such as in an acousto-optic modulator (AOM) or acousto-optic device (AOD).

Another example may use a spatial light modulator (SLM) as the diffractive element. The effective line spacing of a SLM may be varied over time. Changing the line spacing may steer the wavelengths in angle, which may then change the location on a detector or detector array. Alternately changing the line spacing may change the physical distance between wavelengths. Combined with rotation of the SLM, in one or two axes, this can set both the location and separation between multiple wavelengths.

Another example may use a metamaterial or other material where the refractive index can be changed by altering a voltage, current, magnetic field or optical field.

Ambient light rejection—In addition to spatially separating the wavelengths, the diffraction grating also serves as an ambient light rejection filter since only a range of wavelengths and angles incident on the receive aperture may end up on a given photodiode. For example, in the case of FIG. 1, the spatial separation between wavelengths that were 10 nm apart is approximately 1.2 mm. So in this case a 1 mm detector would see a wavelength range, and hence ambient light, of 10 nm/1.2=8.3 nm. As detectors get smaller, for example in a detector array, the ambient light range goes down. A 100 micron detector would only see 0.83 nm bandwidth of ambient light.

Note that in this case the ambient light rejection is only along the dispersion axis of the grating. In the orthogonal direction, all wavelengths that are passed by the optics can still reach the detector. However, if two gratings at nearly right angles are used, the ambient light rejection will occur along both axes and would be similar to the case of a narrow bandpass filter in front of each detector. Since narrow bandpass filters are quite expensive, the diffraction grating serves double duty and can reduce the system cost compared to the case of building many systems where each one operates at a single wavelength.

Another example can use a single polarization grating to increase ambient light rejection. In this case, a laser is polarized, and the fraction of its signal light that whose polarization is roughly aligned to an intended polarization of the grating, is transmitted.

In some examples, the system may have a long-pass filter in the optical path. This may pass wavelengths longer than 780 nm and reject the majority of light from shorter wavelengths. This long-pass filter combined with the spectral response of the photodiode may set the overall bandwidth of the system. This configuration may reduce the impact of ambient light from the sun or other light sources.

In some examples there may be a short-pass filter or a bandpass filter in the optical path. Again, this filter or filters combined with the spectral response of the photodiode may set the overall bandwidth of the system. This configuration may reduce the impact of ambient light from the sun or other light sources In some examples there may be an aperture in the optical paths. This may consist of a thin aperture such as a plate with a hole in it or a long aperture such as a tube. This aperture combined with the other optics may reduce the amount of ambient light that reaches a given photodiode. Ambient light may then be determined by a combination of the diffraction optic, the focusing optics, the aperture, and the size of a particular photodiode.

Figure 3:
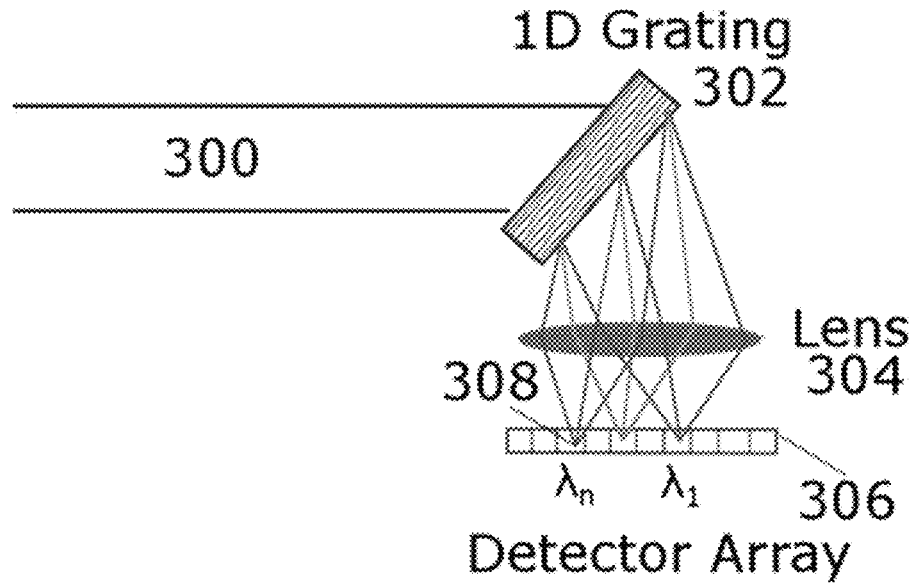
FIG. 3 illustrates a grating disperses light and a lens maps the different wavelengths onto different elements of a one-dimensional detector array, according to various example implementations.

In some examples the receiver may use a one-dimensional (1D) detector array (or linear array) as in FIG. 3. Here the incoming beam 300 diffracts off the grating or diffractive element 302 with different wavelengths separated by angle. For example, all of the red wavelengths, 308 diffract in the same angle and are thus focused to the same spot by the lens 304. The detector array 306 has one or more elements that detect the different wavelengths. Multiple channels may then be spread across the detector array.

Figure 4:
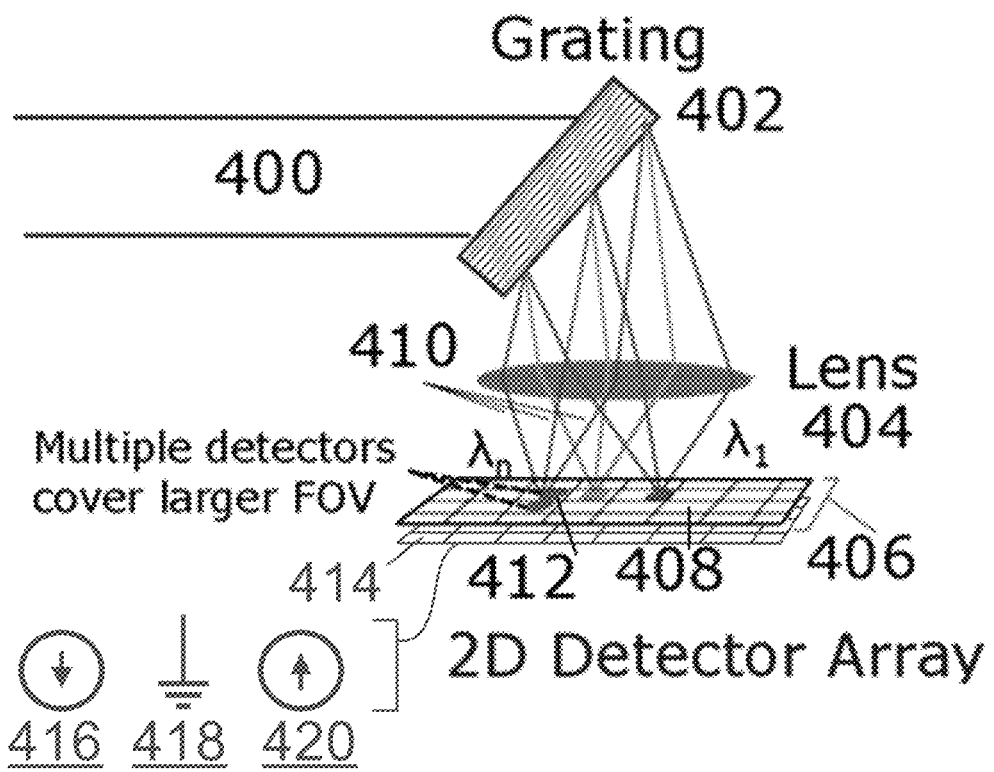
FIG. 4 illustrates a grating disperses incoming light and a lens maps the different wavelengths onto different elements of a two-dimensional (2D) detector, according to various example implementations.

In some examples, the receiver may use a two-dimensional (2D) detector array and use multiple elements in one or each direction to receive signal from any direction shown in FIG. 4. Here, incoming light 400 hits the grating 402 and diffracts in different angular direction. These different angles are focused by the lens 404 onto different elements 408 of the detector array 406. Shown for illustration are different wavelengths, given by, for example 410 where all of these wavelengths diffract at the same angle and are thus focused to the same spot 412 on the detector array 406. The detector array may allow for a larger field of view using multiple elements, as a single wavelength 410 can span multiple detector elements 408 in the array 406.

The convention is that that all or almost all elements should be used in a sensor system. From an engineering standpoint this maximizes both performance and efficiency. But in at least some example implementations of the present disclosure, elements or pixels are purposely added with the knowledge and intent that many or most of these elements will not be actively used. It then becomes necessary to select certain elements for active use. This can be done with a separate solid state switching transistor separately associated with each element. These switches then act to connect each desired element to the appropriate sensing circuitry or analog-to-digital circuit. In certain embodiments, the performance of the overall array may be further enhanced by grounding or pulling up to higher voltage the inactive elements. In these embodiments, a second separate solid state switching transistor would be separately associated with each element. This action can reduce the capacitance, increase the speed, increase reliability and/or decrease noise in the sensor system.

Some examples, then, may provide a light sensor or array with multiple elements in which many or most elements are not utilized and in which the active elements are individually and separately selected for connection to processing circuitry, such as appropriate sensing circuitry, by individual separate solid-state switching devices 414 coupled to each element. In some further examples, the inactive elements are individually and separately selected for connection to a low voltage 416 or ground 418 or to a high voltage 420 by individual separate solid-state switching devices coupled to each element.

The elements of the array may be square, rectangular or hexagonal for a fill factors of 100%. Detector arrays may also have less than 100% fill factor and be circular, or combinations of squares, rectangles, circles, octagons and the like. Shown in FIG. 5 are some possible variations on detector arrays for 100% fill factor (FIG. 5(A)). Here, detectors can be squares and offset from each other 500, or hexagonal in a honeycomb type pattern 502. They can also be combinations of octagons and squares 504. Arrays with less than 100% fill factor are shown in FIG. 5(B). The fill factor of the array may be less than 100% due to manufacturing processes or requirements for routing traces to elements. Here, the detectors can be circular 506, hexagonal 508 with spacing in between or various other shapes 510, 512.

An array may have high speed O-E conversion electronics for each element. After the O-E conversation there may be digital switch fabric(s) to connect active channels with output connection of the box. The system may interrogate channels to see which ones are receiving data and to then to reconfigure the switch fabric to connect active channels with the output. In some configurations the system match specific optical channels with specific output from the box even as the optical channel moves from one optical detector to another optical detector.

In another example there may be fewer A/D channels than optical elements. There may be an analog switch fabric between the optical elements and the A/D channels. Again the system may interrogate optical elements to determine which ones have signal and configure the analog switch fabric accordingly. And the switch fabric may evolve over time as channels move from one optical element to another or optical channels are added or removed from the link.

The analog switch fabric may be implemented using MOSFET arrays or other semiconductor technologies known to those skilled in the art, which provide low resistance switching pathways capable of conveying very high data rates with low losses. These data rates may range from 1 Mbps up to 100 Gbps per channel with technologies within the existing art, and may range up to 100,000,000 Gbps or even higher per channel with future technologies.

One example of this aspect of the present disclosure may have microlens elements that are larger than the detector element and increase the effective fill factor. One example is when the individual element has a very large acceptance angle and a small lens with a gain of 1 to 100. This example trades the large acceptance angle for a smaller acceptance angle over a larger area, thus maximizing the area of the array that can accept light.

Another example may have a lens cover multiple elements and use the relative signal strength on various elements to determine the direction from which the signal light is coming. This information can then be used in a feedback loop for pointing and/or tracking. In another example, the detector may convey to the transmitter what subsection of a laser array is reaching the detector, allowing other lasers to be turned down or off, resulting in lower output power which keeps the system power level below the eye safe level. One example may be a small lens covering four or more detectors; direct alignment may result in equal signal strength on each of the four detectors whereas angular misalignment in either the horizontal or vertical direction may generate a mismatch in signal strength on the two corresponding detectors.

In another example the position of a particular channel on the 1D or 2D array can be used to measure the wavelength of a channel. Once the position of one wavelength is known, the positions of other wavelengths are also known due to the set angular dispersion of the grating. This measurement can be absolute or relative to other wavelengths. This can be used in a feedback loop to the transmitting laser so that the wavelength of that channel stays within a certain range. This range could be a pre-defined channel grid such as the ITU grid used in 1550 nm fiber optic telecommunications. The receiver may feed some light of one or more known wavelengths into the receive optics to calibrate the wavelength mapping of the array.

In some examples, the detector may use multiple elements in the array to detect one channel. This may reduce the amount of ambient light incident on a single detector. This may also increase channel signal-to-noise ratio (SNR) by averaging across multiple detectors. This averaging may be weighted by detector. One weighting may be proportional to total signal strength on each detector. This weighting can be dynamic in time with adjustments made on the basis of signal strength or other metrics or user input. This may be using in combination with the analog or digital switch fabrics described previously.

The size of an individual element may range from less than the size of the wavelength, that is as small as 500 nm up to 10 millimeters. The size may be smaller than the typical telecom detector which is 9 microns in diameter. In some implementations the detector may part of a 1D array that is one detector tall and the height of the detector is more than twice as tall as the width. The width may be 500 nm to 10 microns and the height may be 1 micron up to 1 millimeter. In some implementations the array may be 2D. In this case the individual elements may be as small as 500 nm in diameter while the array is large enough for 0.1 degree of acceptance angle up to 10 degrees of acceptance angle, or even up to $4\pi$ steradians for spherical coverage. The individual elements may be smaller than the typical telecom detector that is 9 microns in diameter. The individual detectors may be smaller than the spot size of an individual optical channel which may range from the wavelength up to 1 millimeter. These dimensions will be set to meet the system requirement of more than 0.1 degree of acceptance angle for a specific channel.

The example may use electronic tracking in lieu of, or in addition to, mechanical tracking. Electronic tracking refers to finding the elements in the array where the channel signal is strongest and routing the signal from those elements to the electronic transceiver. There may be monitoring of the entire array at a rate lower than the bit rate to locate where various channels are located and adjustment of the electronic routing so that each channel goes to the correct electronic transceiver. This monitoring may be done by total signal strength, by assessment of bits transmitted, by a lower rate tracking or alignment signal, or by some other method.

Another example may use one or more wavelengths for tracking in conjunction with a larger array that operates at slower speeds. This array may be located at the same focal plane (or on the same printed circuit board (PCB)) as the high speed detectors or array. In particular, this subarray for the tracking wavelength may be physically wider than the rest of the array so that this section has a larger acceptance angle for the tracking wavelength as compared to the other wavelength. The pixels in this subarray may be larger or smaller than other parts of the array. These pixels may operate at a slower rate since they are used primarily for tracking and not for data transmission. There may be some lower speed data that is transmitted and received by this subarray. This data may include control layer information and identification information.

In another example, the system may rotate the grating for tracking. That is, the grating can take the place of a steering mirror in a more conventional tracking setup. The grating may rotate in either one or both axes either with or without a 1D or 2D detector array or any combination thereof.

Multi-Channel FSO Using Polarization.

Another degree-of-freedom that can be exploited is polarization. Using multiple polarizations at a single wavelength could increase throughput by up to a factor of two. As an example, using horizontal polarization for one channel and vertical polarization for a second channel can double the throughput. Additionally, differential detection could be used to improve signal-to-noise ratio on "0 1" bits versus "1 0" bits. Atmospheric and system propagation effects tend to mix polarizations (or depolarize a given channel) but should be minimal over short ranges (10 meters to 1000 meters).

A possible demultiplexing scheme is comprised of a polarizing beamsplitter (PBS) and two detectors on receive side depicted in FIG. 6. Here, the incoming light 600 hits a quarter waveplate 602 which changes its linear polarization into circular polarization. It then hits the grating 604 and is angularly dispersed. The lens 606 focuses the different wavelengths to different points on the detectors 610 and 612 as before, but the beams pass through an additional optical component, the PBS 608 before landing on the detectors. The PBS separates out each of the two linear polarization components so that say horizontal polarizations land on one detector 610 and vertical polarizations land on the other 612.

Another example may have an array of optics 614 such as two or more mirrors 616 at or near the focal plane of the lens. These mirrors may then steer the specific wavelength channel or polarization channel to one or more detectors. There may be additional optics between the mirror and the detector(s) including, but not limited to, relay lenses, filters, additional steering mirrors or other elements.

In some examples, the mirrors may be fixed whereas in other examples the mirrors may be movable, particularly rotatable, in one or more axes. A particular mirror may be able to steer the channel to more than one other optical path. This may be used as an optical cross connect or for other purposes.

This example may be particularly useful in cases where the mirrors can be made smaller than the detectors or detector arrays. The mirrors may then spread the channels out over a much larger physical area thereby allowing more area for the detectors and associated electronics.

Multi-Channel FSO Using Orbital Angular Momentum.

Photon beams have a polarization, frequency (wavelength), phase, amplitude, and spatial mode. One of the spatial modes that is a solution to the wave equation is called the Laguerre-Gauss beam and these beams carry orbital angular momentum in the same way that a beam that is polarized carries spin angular momentum. The orbital angular momentum of the beam must be conserved and because it has a complete orthonormal basis of modes, it can be used as an additional degree-of-freedom to encode information. The orbital angular momentum numbers of the beam can be used as bits of information like the wavelength or polarization or as separate channels.

In some examples, a spatial light modulator (SLM) or phase plate generates one or more OAM states on each of one or more different wavelengths. This decreases the photons per bit in the signal because it creates a higher dimensional space that encodes the information in both OAM and wavelength.

Shown in FIG. 7 is an example of multiplexing and demultiplexing a hybrid OAM-wavelength system. In FIG. 7(A) the signal beam 708 is generated by first multiplexing multiple wavelengths from a laser array 700 into a single beam using a diffraction grating 704 and lens 702, then imparting OAM into the beam via a SLM 706 (or spiral phase plate) to change its phase. The beam can be demuliplexed as shown in FIGS. 7(B) and 7(C) by a phase-unwrapper 712,732, which maps the different phases of the OAM states to different linear locations. In FIG. 7(B), the incoming beam 710 is made up of many different wavelengths and many different OAM modes. A mode sorter for OAM modes has been demonstrated and uses a phase-unwrapper 712 to map the angular momentum into linear momentum and then to and angle 714. This is completely analogous to the grating separating different wavelengths into separate spatial locations. Once the OAM states 714 are separated by a mode sorter, they hit a grating 716 to spatially separate out the wavelengths by angle and then a lens 718 which focuses each wavelength set to a different point on the detector array 720. Each detector array can be made up of subarrays 722 which are detect beams of the same wavelength. Within each array individual detectors 724 detect the different OAM modes.

Alternatively, demultiplexing can be accomplished in the opposite order where first the wavelengths are separated and then the OAM modes. This is shown in FIG. 7(C) where the incoming beam 726 first hits the grating 728 and lens 730 and is angularly/spatially separated by wavelength. Each different wavelength is focused into a phase-unwrapper 732 or mode sorter which further separates out the OAM modes 734 onto the detector subarrays 738 and onto each individual detector 740.

Types of Detectors.

The optical to electrical conversions described herein may be implemented with many different types to detector technology. This includes currently available detectors such as PIN photodiodes, avalanche photodiodes (APD's), silicon photomultiplier (SIPM's), and photomultiplier tubes. These may be implemented in various materials that correspond to the wavelengths being using including silicon, germanium, InGaAs (indium, gallium, arsenide), GaAs (gallium arsenide), and others.

Emerging detector technologies may also be used. These include quantum dots, nanowires, and others. Some are based on graphene and graphene combined with other materials such as quantum dots. Some of these, such as quantum dots may have intrinsic spectral response profiles that are advantageous. Some may be tuned to have a higher responsivity at wavelengths with signal and lower responsivity at wavelengths that do not have signal, thus reducing the impact of ambient light. Some of these may have higher response rates (i.e. bit rate) compared to the current art of avalanche photodiodes. This enables larger element or pixel size for an individual receiver, linear array or 2D array.

Eye Safety with Multi-Channel FSO.

Multiple channels inherently require more light to increase the overall data capacity. This has the potential to increase the intensity level at the transmitter above the eye safe level. There are several innovations to mitigate this issue and keep the optical power level below the eye safety limits.

Use modulation schemes with lower power per bit. Some DBFSO systems may use OOK (on-off-keying where the laser is on for a 1 and off for a 0). The number of 1's and 0' is the same on average, so the average power level per bit is 0.5. Other modulation schemes have different power level per bit levels. For example, PPM places one laser pulse within a pre-defined frame. The frame size for n bits is $2^n$, however the average power level per bit is $1/n$, since the "1" pulse now generates n bits of information. The overall power level is now $1/(2^n)$ so for n>2 the average power level is lower than OOK. As a concrete example, for n=3 there are 8 slots in the frame. One of the slots has a pulse of light in it. The average power level is ⅛ of the OOK power, and the information rate is ⅜ of the bin rate. It may take 4 channels to get to the same average power level as OOK, and the information rate may now be 4*(⅜) or 1.5 times the bin rate (or OOK bit rate).

Use multiple transmit apertures. Increasing the number of transmit apertures may increase the total average power that can be transmitted, since the eye safety concerns are only when the eye is very close to the transmitter shown in FIG. 8. Using multiple sources, each with some fraction of the sum of the power, spreads the total power out over a larger area thereby making the system more eye safe. Here, the RX 800 is centered with multiple TX elements 802a-802h positioned around it to increase the total area and thus decrease the power density. By the time the eye can see multiple transmitters, it may be far enough away that the total power from all transmitters is still below the eye safe level. A given aperture may have one or more transmitters behind it. One the receive side, a single aperture may be used, allowing the use of one grating or dispersive element to separate out the multiple channels. The receiver may have more than one aperture as well.

Use subarrays within a larger array. In a DBFSO system, the beam covers a much larger area than the receive aperture. In a multi-channel system it is advantageous to turn off the sections of a laser array for a given wavelength that are not reaching the receive aperture in question. In some examples, this may be done for some of the wavelengths so that at least one wavelength covers the full range, say +/−1 degree. Other wavelengths may now only cover +/−0.1 degree, which reduces the needed launch power by a factor of 100, and can receive the required feedback information via the wavelength that still has +/−1 degree of coverage. Total launch power can be significantly reduced while maintaining a large angular range of coverage. These ranges are only examples, any range within an overall DBFSO design space may be used.

Pointing and Tracking.

Systems proposed may or may not use the aid of mechanical pointing or steering. In many cases, even with a wide field-of-view, it is advantageous to have some coarse pointing capabilities on both transmit and receive either separately or coupled. This coarse pointing capability may increase the field of view of the node from the intrinsic acceptance angle (0.1 degree up to 10 degrees) to a larger angular range, typically 5 degrees up to 360 degrees. Pointing may occur in the horizontal axis (sometimes referred to as pan), the vertical axis (sometimes referred to as tilt), or both axes.

One method of steering uses external mounts and mechanical hardware and is shown in FIG. 9(A). Here, the receiver (RX) 902 is centered on the structure with multiple transmitters 900 surrounding it as shown in FIG. 8. The transceiver is held in a cradle 904 that can tip in the polar direction and may be driven by various types of motors including steppers or DC motors (not shown). The assembly is mounted on a rotation mount 906 which pans (rotates in the azimuthal direction) and this rotation mount is attached to a stationary base 908.

Alternatively, the structure can be stationary while the optical components are rotated within it as shown in FIG. 9(B). Here the transmitters 910 and receiver 912 are mounted inside a fixed mount 920 with a window 914. There are internal pan 918 and tip 916 points where the transmit 910 and receive 912 structure is mounted. The internal transmit 910 and receive 912 oscillate about these pivot points within the fixed structure 920.

Capacities.

Channel capacity—The first implementation of a single channel has bit rate of 100 Mbps while the next iteration has 1 Gbps. On the low end, per channel capacity may be as low as 1 Mbps. On the high end, some examples may have a channel capacity that can reach data rates of at least 10 Gbps with OOK. Some examples may have channel capacities up to 100 Gbps with OOK. Other examples may have higher channel data rates up to 1 Tbps, particularly with other forms of encoding including phase modulation and other approaches.

Link capacity—Link capacity is defined as the number of channels times the bit rate per channel. Number of channels in a given link can range from 1 to at least 1,000. Link capacity is fundamentally limited by physical bandwidth in the medium. The total bandwidth between 800 nm and 900 nm is 42 Terahertz. At 1 bit/Hz, this is 42 Tbps, which can be theoretically achieved with OOK. Other modulation approaches can increase throughput up to 10 bit/Hz, allowing 420 Tbps over this bandwidth. If the bandwidth is expanded to the total spectrum that is outside the range of visible light and can also be accessed with existing detector technologies (~780 nm to 2000 nm) this give a total bandwidth of 235 THz. All of this bandwidth can be accessed for these multi-channel links described herein.

Node capacity—Node capacity is defined as the number of links from a node times the capacity per link. The limit on the number of links is approximately the total accessible angular range divided by the angular divergence of each link. Link spacing closer than this may start to experience cross talk. For the example with one row of links covering 360 degrees and a link divergence of +/−1 degree, a node may have 180 links. Additional rows of links may significantly increase the node capacity. FIG. 10 illustrates potential increase in channel, link and node capacity over time based on the teachings of the present disclosure.

Cost scaling—as previously disclosed, DBFSO systems can increase throughput by increasing the number of transmitter/receiver pairs and operating them so that crosstalk is below an acceptable level. This can be done with multiple wavelengths, multiple spatial locations, and other implementations. In this case, the cost generally scales linearly with the number of channels, since each channel includes its own transceiver on each end of the link. This may be acceptable in some uses. This disclosure covers architectures and approaches that reduce the cost below the linear scaling by parallelizing some of the system.

Many modifications and other implementations of the disclosure set forth herein will come to mind to one skilled in the art to which these disclosures pertain having the benefit of the teachings presented in the foregoing descriptions and the associated figures. Therefore, it is to be understood that the disclosures are not to be limited to the specific implementations disclosed and that modifications and other implementations are intended to be included within the scope of the appended claims. Moreover, although the foregoing descriptions and the associated figures describe example implementations in the context of certain example combinations of elements and/or functions, it should be appreciated that different combinations of elements and/or functions may be provided by alternative implementations without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. A diverged-beam, free space optical (DBFSO) communications system comprising:
   an optical transmitter configured to produce a plurality of optical carrier signals of respective wavelengths for a plurality of communication channels, combine the plurality of optical carrier signals into an optical beam, and transmit the optical beam for propagation in free space with a beam divergence of greater than 0.1 degrees; and
   an optical receiver configured to receive the optical beam propagating in free space, spatially separate the optical beam by wavelength into the plurality of optical carrier signals, and convert the plurality of optical carrier signals into a respective plurality of electrical signals for the plurality of communication channels, the optical receiver including a plurality of optical detectors configured to convert the plurality of optical carrier signals into the respective plurality of electrical signals, the plurality of optical detectors including at least twice as many optical detectors as optical carrier signals in the plurality of optical carrier signals.

2. The DBFSO system of claim 1, wherein the optical receiver includes a demultiplexer with a diffraction grating configured to spatially separate the optical beam by wavelength into the plurality of optical carrier signals.

3. The DBFSO system of claim 2, wherein the optical receiver includes a demultiplexer with a holographic volume phase grating configured to spatially separate the optical beam by wavelength into the plurality of optical carrier signals.

4. The DBFSO system of claim 1, wherein the optical receiver includes a demultiplexer with first and second diffractive optics configured to spatially separate the optical beam along two axes.

5. The DBFSO system of claim 1, wherein each of the optical detectors of the plurality of optical detectors is at most 9 microns in size.

6. The DBFSO system of claim 1, wherein the optical receiver includes a demultiplexer including a diffractive optic configured to spatially separate the optical beam by wavelength into the plurality of optical carrier signals, and an additional optic configured to split the optical carrier signals by polarization.

7. The DBFSO system of claim 1, wherein the optical receiver includes a demultiplexer including a diffractive optic configured to spatially separate the optical beam by wavelength into the plurality of optical carrier signals, and an additional optic configured to split the optical carrier signals by orbital angular momentum.

8. The DBFSO system of claim 1, wherein the optical receiver includes a demultiplexer including a diffractive optic configured to spatially separate the optical beam by wavelength into the plurality of optical carrier signals, and further includes an array of optics between the diffractive optic and detector array, the array of optics configured to spatially spread the plurality of optical carrier signals.

9. The DBFSO system of claim 8, wherein the array of optics is an array of mirrors.

10. The DBFSO system of claim 1, wherein the plurality of optical detectors includes multiple detectors for each communication channel of the plurality of communication channels,
wherein the optical receiver further includes solid-state switching devices coupled to respective ones of the plurality of optical detectors, and by which the respective ones of the plurality of optical detectors are individually and separately selectable for connection to processing circuitry, and
wherein the multiple detectors for each communication channel are individually and separately selectable so that in some instances at least some but not all of the multiple detectors are selected, and others of the multiple detectors are not utilized.

11. The DBFSO system of claim 10, wherein the others of the multiple detectors that are not utilized are connected to a low voltage or ground, or to a high voltage, by respective ones of the solid-state switching devices coupled to the others of the multiple detectors.

12. An optical receiver for a diverged-beam, free space optical communications system, the optical receiver comprising:
a demultiplexer including a diffractive optic configured to receive an optical beam propagating in free space with a beam divergence of greater than 0.1 degrees, the optical beam including a plurality of optical carrier signals of respective wavelengths for a plurality of communication channels, the diffractive optic configured to spatially separate the optical beam by wavelength into the plurality of optical carrier signals; and
a detector array including a plurality of optical detectors configured to convert the plurality of optical carrier signals into a respective plurality of electrical signals for the plurality of communication channels, the plurality of optical detectors including at least twice as many optical detectors as optical carrier signals in the plurality of optical carrier signals.

13. The optical receiver of claim 12, wherein the diffractive optic is a diffraction grating.

14. The optical receiver of claim 13, wherein the diffraction grating is a holographic volume phase grating.

15. The optical receiver of claim 12, wherein the demultiplexer includes first and second diffractive optics configured to spatially separate the optical beam along two axes.

16. The optical receiver of claim 12, wherein each of the optical detectors of the plurality of optical detectors is at most 9 microns in size.

17. The optical receiver of claim 12 further comprising an additional optic configured to split the optical carrier signals by polarization.

18. The optical receiver of claim 12 further comprising an additional optic configured to split the optical carrier signals by orbital angular momentum.

19. The optical receiver of claim 12 further comprising an array of optics between the diffractive optic and detector array, and configured to spatially spread the plurality of optical carrier signals.

20. The optical receiver of claim 19, wherein the array of optics is an array of mirrors.

21. A diverged-beam, free space optical (DBFSO) communications system comprising:
an optical transmitter configured to produce a plurality of optical carrier signals of respective wavelengths for a plurality of communication channels, combine the plurality of optical carrier signals into an optical beam, and transmit the optical beam for propagation in free space with a beam divergence of greater than 0.1 degrees; and
an optical receiver configured to receive the optical beam propagating in free space, spatially separate the optical beam by wavelength into the plurality of optical carrier signals, and convert the plurality of optical carrier signals into a respective plurality of electrical signals for the plurality of communication channels, the optical receiver including a plurality of optical detectors configured to convert the plurality of optical carrier signals into the respective plurality of electrical signals, the plurality of optical detectors having an acceptance angle greater than 0.1 degree for at least some of the communication channels.

22. The DBFSO system of claim 21, wherein the optical receiver includes a demultiplexer with a diffraction grating or a holographic volume phase grating configured to spatially separate the optical beam by wavelength into the plurality of optical carrier signals.

* * * * *